US010015951B2

(12) United States Patent
Woolwine et al.

(10) Patent No.: US 10,015,951 B2
(45) Date of Patent: Jul. 10, 2018

(54) PET TREAT HOLDER AND SAFETY DEVICE

(71) Applicant: BOW WOW LABS, INC., Novato, CA (US)

(72) Inventors: J. Scott Woolwine, Orinda, CA (US); Julie Hackett, Orinda, CA (US)

(73) Assignee: Bow Wow Labs, Inc., Novato, CA (US)

( * ) Notice: Subject to any disclaimer, the term of this patent is extended or adjusted under 35 U.S.C. 154(b) by 432 days.

(21) Appl. No.: 14/701,835

(22) Filed: May 1, 2015

(65) Prior Publication Data
US 2015/0313184 A1 Nov. 5, 2015

Related U.S. Application Data

(60) Provisional application No. 61/987,054, filed on May 1, 2014.

(51) Int. Cl.
A01K 29/00 (2006.01)
A01K 1/10 (2006.01)
A01K 15/02 (2006.01)

(52) U.S. Cl.
CPC .......... A01K 15/026 (2013.01); A01K 15/025 (2013.01); Y10T 29/49828 (2015.01)

(58) Field of Classification Search
USPC ............. 119/51.01, 702, 706–710; D30/160; 273/317; 473/569, 579, 580, 612, 614; 279/48, 49, 52, 56; 446/61–63, 473
See application file for complete search history.

(56) References Cited

U.S. PATENT DOCUMENTS

| 493,231 | A | * | 3/1893 | Muir | |
|---|---|---|---|---|---|
| 511,039 | A | * | 12/1893 | Bowen | |
| 1,175,035 | A | * | 3/1916 | Wooster | F41B 3/00 124/41.1 |
| 1,187,497 | A | * | 6/1916 | Canfield | B23B 31/20 279/47 |
| 1,230,561 | A | * | 6/1917 | Blake | B23B 31/202 24/136 B |
| 1,513,099 | A | * | 10/1924 | Fox | A41F 3/02 24/532 |
| 1,765,362 | A | * | 6/1930 | Berry | B23B 31/20 279/145 |
| 2,374,725 | A | * | 5/1945 | Blake, Jr. | B23B 31/202 279/52 |
| 2,496,684 | A | * | 2/1950 | Upchurch | A45D 19/08 220/571 |
| 4,215,871 | A | * | 8/1980 | Hirsch | B23B 31/1253 279/46.3 |
| 5,213,015 | A | * | 5/1993 | Disston, Jr. | B25B 9/00 279/52 |

(Continued)

Primary Examiner — Andrea Valenti
(74) Attorney, Agent, or Firm — The Law Office of Mark Williams, PLLC

(57) ABSTRACT

A pet treat holding device may comprise a head and a plurality of opposable arms. The plurality of opposable arms may be articulably attached to the head and movable between a first position and a second position. The arms may define a cavity configured to receive an end of an elongated treat such as a bully stick. The device may comprise a twist ring that threadedly engages the opposable arms and operates to secure the arms of the device around the inserted end of the elongated treat.

20 Claims, 13 Drawing Sheets

(56) References Cited

U.S. PATENT DOCUMENTS

| | | | | |
|---|---|---|---|---|
| 5,439,005 A | * | 8/1995 | Vaughn | A61B 17/1633 279/42 |
| 5,944,327 A | * | 8/1999 | Kanaan | B23B 31/201 279/51 |
| D423,152 S | * | 4/2000 | Kelly | D30/160 |
| 6,076,486 A | * | 6/2000 | Oliano | A01K 15/026 119/709 |
| 6,167,605 B1 | * | 1/2001 | Morales | A61F 2/958 29/282 |
| 6,186,096 B1 | | 2/2001 | Miller | |
| 6,470,830 B2 | | 10/2002 | Mann | |
| D500,901 S | * | 1/2005 | Crane | D30/160 |
| D500,902 S | * | 1/2005 | Crane | D30/160 |
| D528,710 S | * | 9/2006 | Oblack | D30/160 |
| 7,278,374 B2 | | 10/2007 | Mann | |
| 7,647,894 B2 | | 1/2010 | Axelrod et al. | |
| D625,474 S | * | 10/2010 | Byrne | D30/160 |
| 8,087,387 B2 | * | 1/2012 | Gamble | A01K 15/026 119/707 |
| 2006/0048718 A1 | | 3/2006 | Mann | |
| 2006/0099881 A1 | * | 5/2006 | Dodgen | A63H 3/005 446/369 |
| 2007/0044730 A1 | | 3/2007 | Axelrod et al. | |
| 2009/0217885 A1 | | 9/2009 | Peter et al. | |
| 2013/0087104 A1 | * | 4/2013 | Williams | A01K 15/025 119/707 |
| 2013/0097901 A1 | * | 4/2013 | Cooper | A01K 15/026 40/299.01 |
| 2014/0079574 A1 | * | 3/2014 | Brunner | F16D 1/08 417/423.3 |
| 2015/0257365 A1 | * | 9/2015 | Renforth | A01K 15/025 119/708 |
| 2016/0113241 A1 | * | 4/2016 | Valle | A01K 15/026 119/51.01 |

* cited by examiner

PET TREAT HOLDER AND SAFETY DEVICE

CROSS-REFERENCE TO RELATED APPLICATIONS

This application claims priority to U.S. Provisional Application No. 61/987,054, entitled "PET TREAT HOLDER AND SAFETY DEVICE" filed on May 1, 2014, the entire contents of which are herein incorporated by reference.

FIELD

The present technology relates generally to a pet-related device, and, more particularly, to a molded pet treat holder that secures pet treats to prevent swallowing or choking and/or to reduce the amount of wasted treat.

BACKGROUND

Consumable and non-consumable pet toys or treats provide a variety of benefits for both pets and their handlers. Various types of toys and treats can encourage positive interaction and socialization between a pet and its handlers. Chewable pet toys and treats can provide pets with entertainment and relief from stress caused by separation anxiety, loneliness and boredom. Chewable pet toys and treats can also provide for enhanced dental prophylaxis and masticatory exercise, and relief from pain associated with teething. Treats such as bully sticks (i.e., bull pizzle), rawhide sticks and other chewable animal food products are popular consumable toys or treats for pets. However, pets often instinctively consume chewable objects, including both durable and consumable objects, in-part or in-whole. This can frequently lead to circumstances that are detrimental to the health of the pet.

Choking due to ingestion of chewable pet toys or treats by dogs is a common reason for emergency visits to animal hospitals and veterinarian offices. Although a minority of these cases results in death, emergency medical treatment is costly. Bully sticks and rawhide sticks can be particularly problematic due to their appealing taste and satisfying decomposition during extended chewing, with dogs often attempting to consume the entire treat rather than merely chewing on it. Extended chewing of bully sticks and rawhide can produce a soggy, gooey mass that, if swallowed, can lodge in a dog's throat or become impacted in the digestive tract, leading to choking, impaction, and other potentially life-threatening consequences. The more that the dog drinks or the dog's body produces saliva to try to dislodge the bully stick or rawhide, the more the mass swells, further exacerbating the problem. Additionally, dog's frequently attempt to swallow unchewed or partially-chewed ends of treat that they can no longer effectively grasp with their forepaws, creating an additional or greater risk due to the still-rigid nature and often unmanageable length of the incompletely-chewed end of the treat.

The cost of treats such as bully sticks and other consumable chew toys can deter pet owners from removing the end of the toy from their pets, as removing and discarding the short end that the pet is unable to effectively grasp and chew can frequently comprise a significant portion of the overall toy length. Some pet owners simply elect not to offer their pets consumable treats such as bully sticks or rawhide sticks due to safety concerns and/or cost considerations related to the portion of such treats that are difficult for the pet to chew and safely consume.

Various pet toys are available that can be used to hold treats or consumable chew toys. However, currently available toys do not securely hold a treat. Thus, improved treat holders and methods of securing pet treats are desirable.

SUMMARY

In various embodiments, a pet treat holding device may comprise a head, a body, and a twist ring. The body may comprise a plurality of opposable arms. Each opposable arm may comprise a proximal end and a distal end. The proximal end of each arm may be operably attached to the head of the pet treat holding device. Each of the plurality of arms may be moveable between a first position and a second position. When each of the arms is in the second position, the plurality of arms may define a cavity comprising one of a cylindrical shape and a frustoconical shape. The cavity may have an opening at the distal end of the device. Each arm may have an interior surface and an exterior surface. The exterior surface of each arm may comprise a plurality of protrusions distributed longitudinally along the exterior surface of the arm. The twist ring may comprise an annular structure with an interior surface and an exterior surface. The interior surface may comprise a helical ridge with a first and second end. The helical ridge of the twist ring may be received by valleys defined by adjacent protrusions on an arm of the device. Rotational movement of the twist ring may translate the twist ring axially along the body of the device, with rotational movement of the twist ring in a first direction producing axial translation in a first axial direction, and rotational movement of the twist ring in a second axial direction producing axial translation in a second axial.

In various embodiments, the head and the body of the device may be unitary. The head and the body may comprise a plurality of materials. Each of the plurality of materials may be integrally joined. The plurality of materials may be joined by manufacturing the device using an overmolding process.

In various embodiments, a method of securing a treat in a safety device may comprise inserting a first end of a treat into a cavity of a safety device comprising a head, a plurality of arms, and a locking mechanism. The cavity may be defined by the plurality of arms. The plurality of arms may be closed around the first end of the treat. A locking mechanism may be secured around the plurality of arms. The locking mechanism may be secured by translating axially from the proximal end of the arms toward the distal end of the arms. The locking mechanism may be threadedly engaged to the plurality of arms, and translation of the locking mechanism may be accomplished by rotation of the locking mechanism. In various embodiments, a locking mechanism may be wrapped around the plurality of arms. The locking mechanism may produce an increased compression force within the arms, with the increased compression force producing an increased static friction force between a portion of the interior surface of the plurality of arms and a portion of the surface of the treat inserted in the cavity.

In various embodiments, a method of manufacturing a pet treat holding device may comprise form an arm support component from a first material. An arm lining component comprising a second material may be attached to the arm support component. A plurality of arms may be attached to a head. The plurality of arms and the head may comprise a third material configured to be elastically deformable. Each of the plurality of arms may be configured to be independently articulable relative to the head. The arm support component may be formed by injection molding. The arm lining component may be attached to the arm support component by a first overmolding step. A second overmolding step may be used to form the exterior body component. The exterior body component comprising the exterior of the head and the arms may attach the plurality of arms to the head.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, a "treat," "chew toy," or "consumable chew toy" can include any chewable animal food products such as rawhide sticks and "bully sticks" or "pizzles" (treats derived from the penis of a bull or other large animal).

As used herein, "articulable" means capable of being articulated; joined or connected in a manner that allows movement.

Figure 5A:
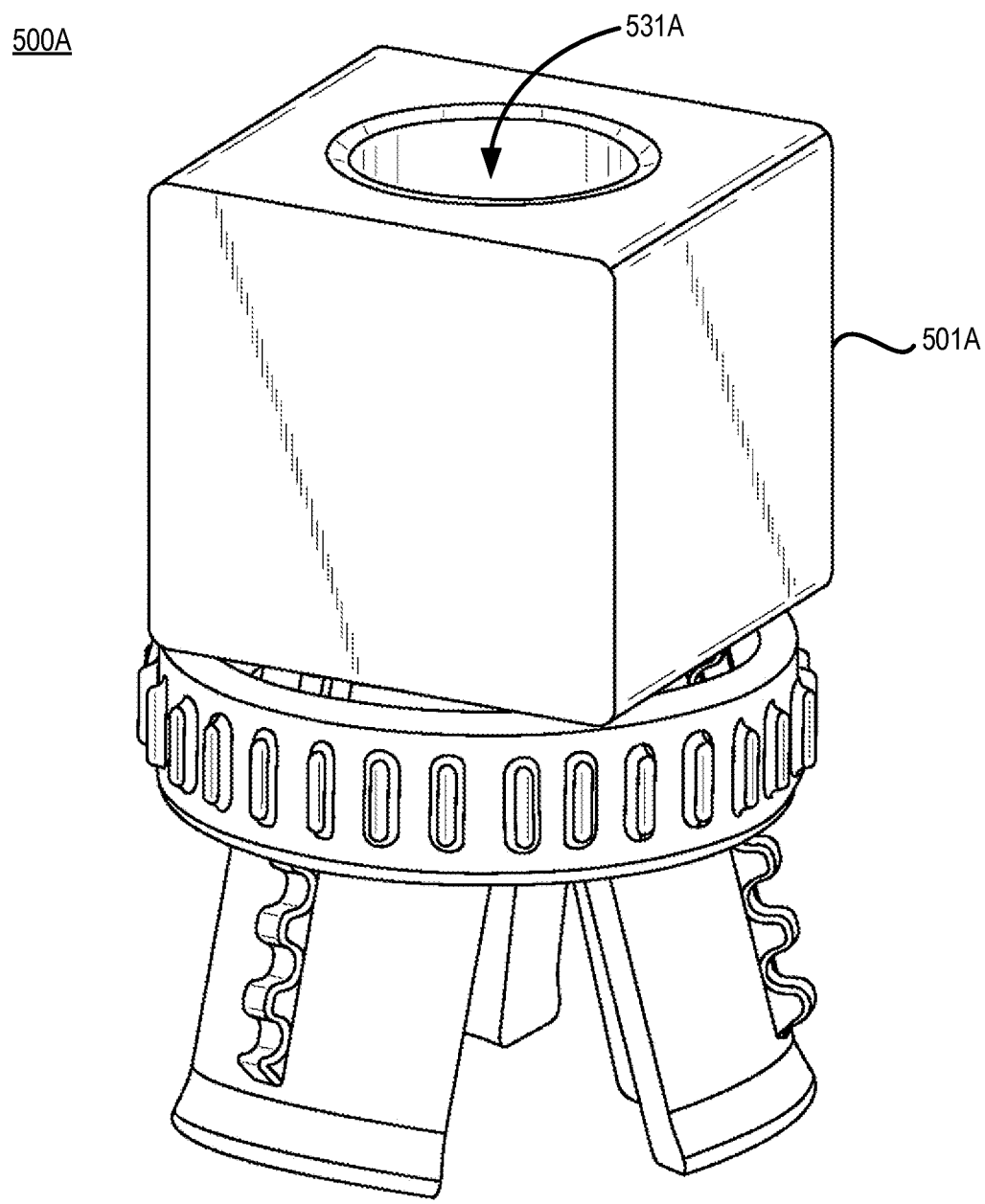
FIGS. 5A-5C illustrate perspective views of devices in accordance with various embodiments.
Figure 5B:
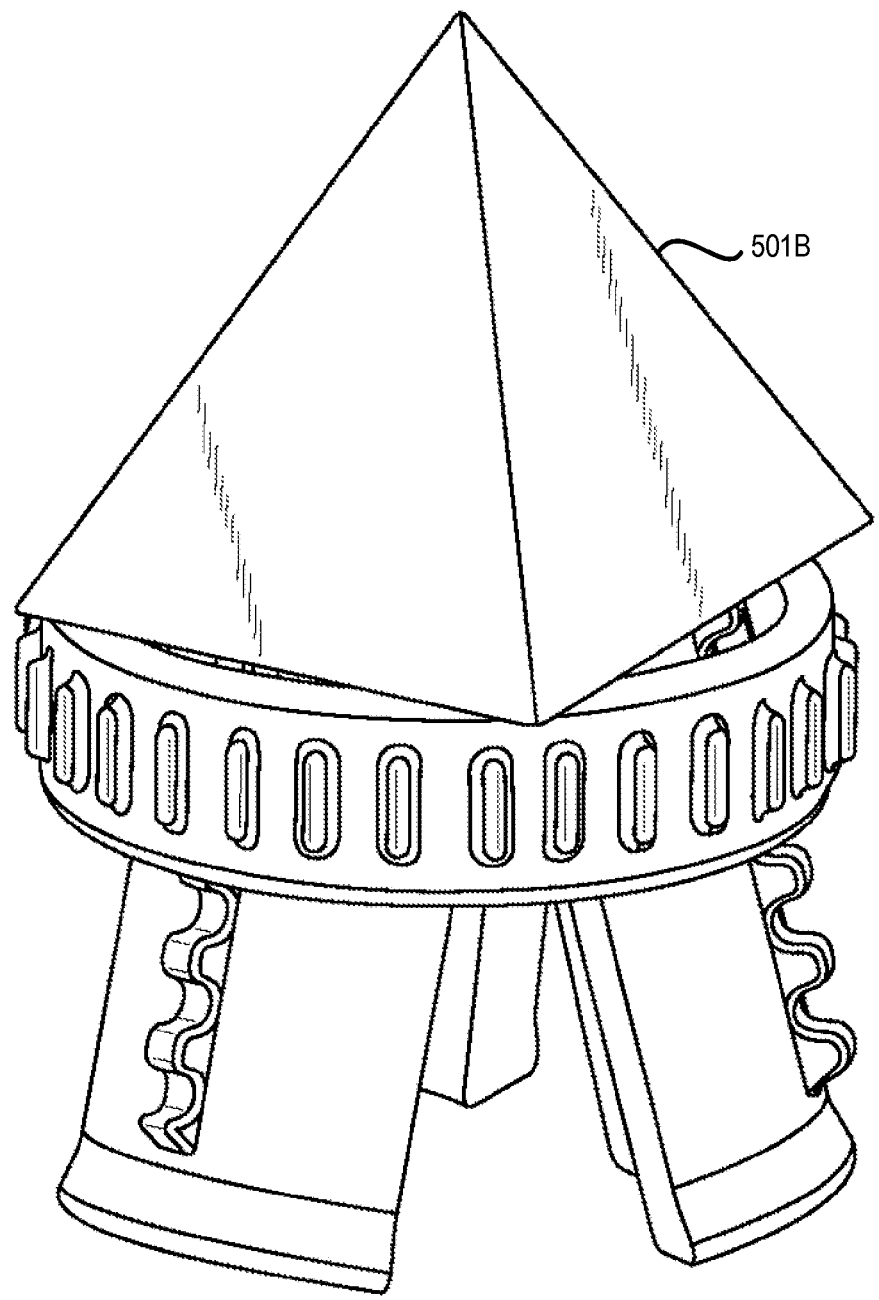
Figure 5C:
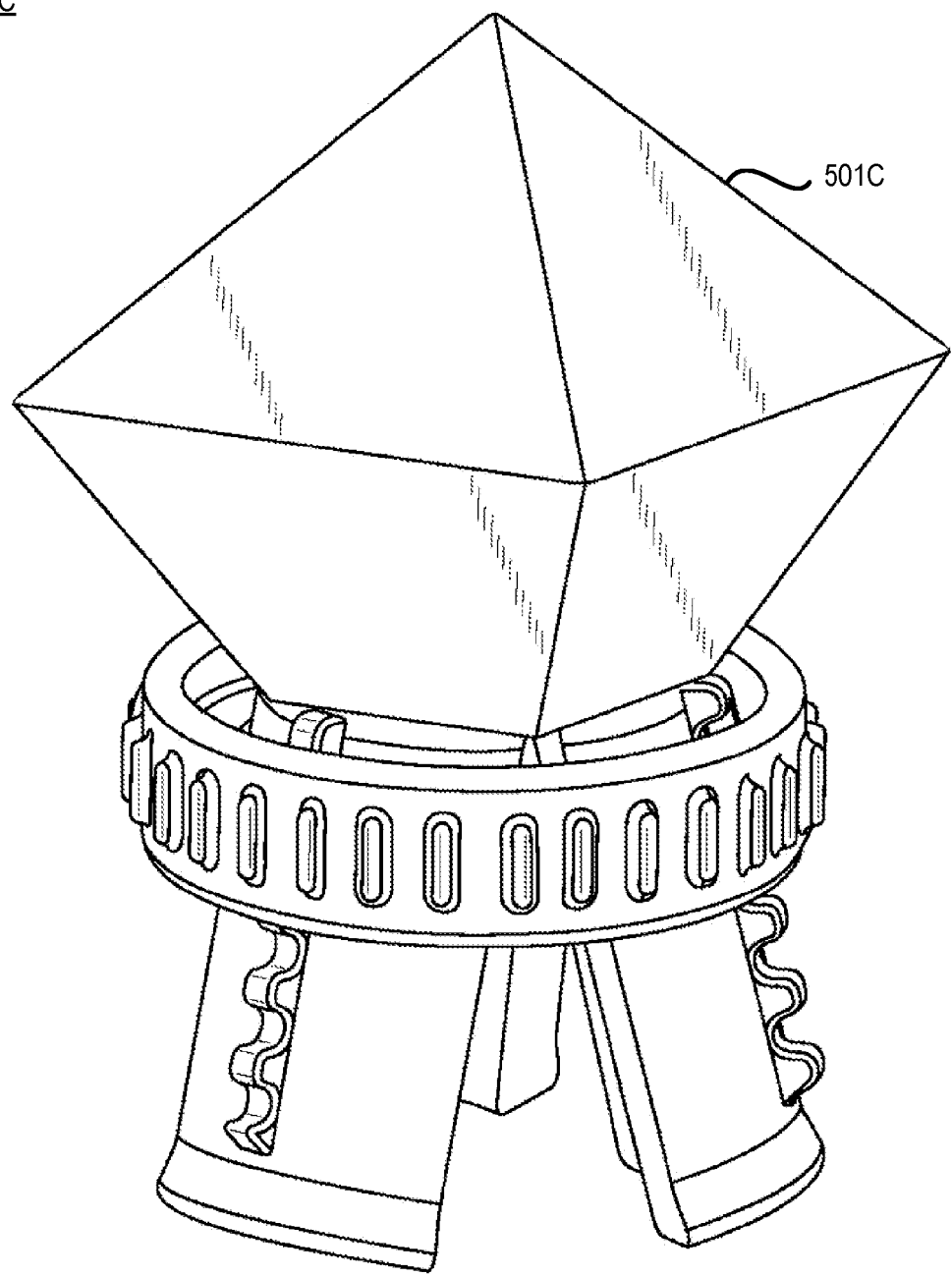

With reference to FIG. 1A, a perspective view of a device 100 in accordance with various embodiments is shown. The device 100 can comprise a head 101 and a body 102 comprising a plurality of arms 103. Device 100 may have an elongated configuration extending along the axis marked A-A', with A being located near a proximal end of device 100 toward head 101 and A' being located near the distal end of device 100 toward distal ends of arms 103. Head 101 can comprise a bulbous portion of device 100. Head 101 can comprise a substantially spherical shape, as shown for device 100. In various embodiments, devices may be configured with a head portion comprising other shapes, including any of a variety of geometric and irregular shapes. For example and with reference briefly to FIGS. 5A-5C, in various embodiments, devices 500A, 500B, or 500C may be configured with head portions 501A, 501B, and 501C having various non-spherical geometric shapes. In various embodiments and as illustrated in FIG. 5A, a head of a device such as head 501A may also comprise a depression or cavity opening 531A. Other shapes and configurations of a device head, including any of a variety of regular or irregular shapes and surface patterns, textures, or features are possible within the scope of the present disclosure. The head portion of a device may provide a pet with increased leverage or ability to manipulate the device with its forelegs and/or paws to enhance the pet's ability to chew on a treat secured by the device. In various embodiments, the configuration or features of a head portion may provide one or more flat surfaces or stabilizing features that may stabilize the head of a device when in contact with the surface of the ground or a floor. In various embodiments, the head portion may deter or prevent a pet from swallowing an end or portion of a treat secured in the device.

With reference again to FIG. 1A, each arm 103 can comprise a proximal end 104 and a distal end 105. The proximal end 104 of each arm can be operably or articulably attached to the head 101. Each of the arms 103 may articulate at about the position of attachment to the head 101 and be movable between a first position and a second position. With reference now also to FIG. 2A, the first position may be an "open" position, with the distal end 105 of each arm 103 moved or deflected outward from axis A-A'. Referring now also to FIG. 2B, the second position may be a "closed" position, with the distal end 105 of each arm 103 moved radially inward relative to the first position, with the orientation of each arm 103 being substantially parallel to axis A-A'. In various embodiments, articulation of each arm 103 at about the position of attachment to the head 101 may be accomplished by flexion and/or elastic deformation of the materials comprising device 100 in the area of attachment of the proximal end 104 of each arm 103 to head 101. Thus, the plurality of arms 103 are opposable, with each arm configured to articulate from the first position toward the second position, thereby moving toward each of the other arms 103 of body 102 in an opposable manner configured to apply compressive force to an object located in a cavity 108 defined by the arms 103 when a twist ring or other securing mechanism is engaged, as described in greater detail below.

Figure 4A:
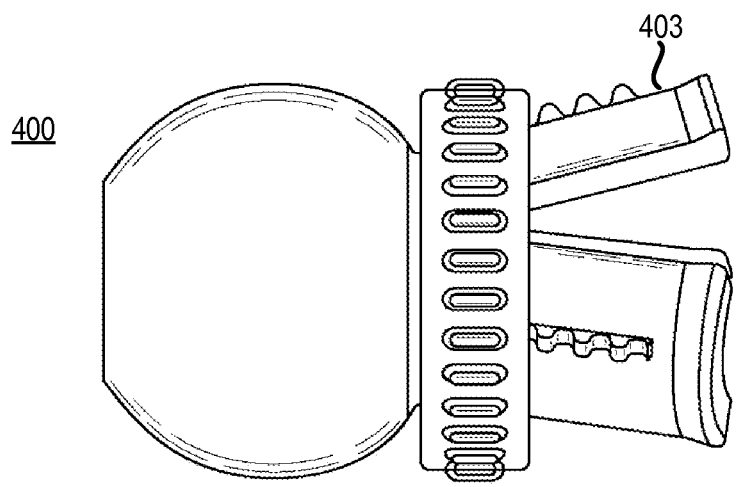
FIGS. 4A-4C illustrate views of a device in accordance with various embodiments.
Figure 4B:
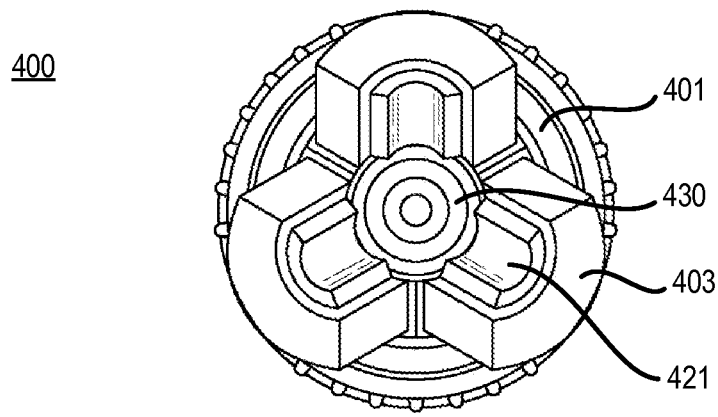

Referring again to FIG. 1, each arm 103 may comprise an interior surface 106 and an exterior surface 107. The plurality of arms 103 may define cavity 108 extending through body 102 along the axis A-A'. In various embodiments, cavity 108 may be open at the distal end of body 102 and arms 103 and closed at the proximal end. Cavity 108 may extend into head 101, terminating in a depression in head 101 between the attachment points of proximal ends 104 of arms 103 (see, for example, depression 430, FIG. 4B). The depression may have a frustoconical shape, a cylindrical shape, or other shape. In various other embodiments, a cavity may extend through the head of the device and be open on either end of the device. In accordance with various embodiments and as described in greater detail below, cavity 108 may be configured to receive an elongated pet treat such as a rawhide stick or a bully stick, and arms 103 defining cavity 108 may be configured to close and be secured around the rawhide stick or bully stick in cavity 108.

With reference also to FIG. 2B, when arms 103 are in the second or "closed" position, surfaces 106 of arms 103 may define a cavity 108 having one of a substantially cylindrical shape and a substantially conical shape. For example, in various embodiments, cavity 108 may have a substantially frustoconical shape with a larger diameter toward the proximal end 104 of arms 103 and a smaller diameter toward the distal end 105 of arms 103. For example, arms 103 may define a cavity 108 with a substantially frustoconical shape having a smaller diameter toward the distal end of body 102 due to arms 103 each having an increased thickness (i.e., the radial dimension between interior surface 106 and exterior surface 107) for a second axial position of an arm 103 as compared to a first axial position of the arm 103. A first axial position may be located toward the proximal end 104 of arm 103 and a second axial position may be located toward the distal end 105 (i.e., located distally to the first axial position), as described in greater detail below.

Figure 1:
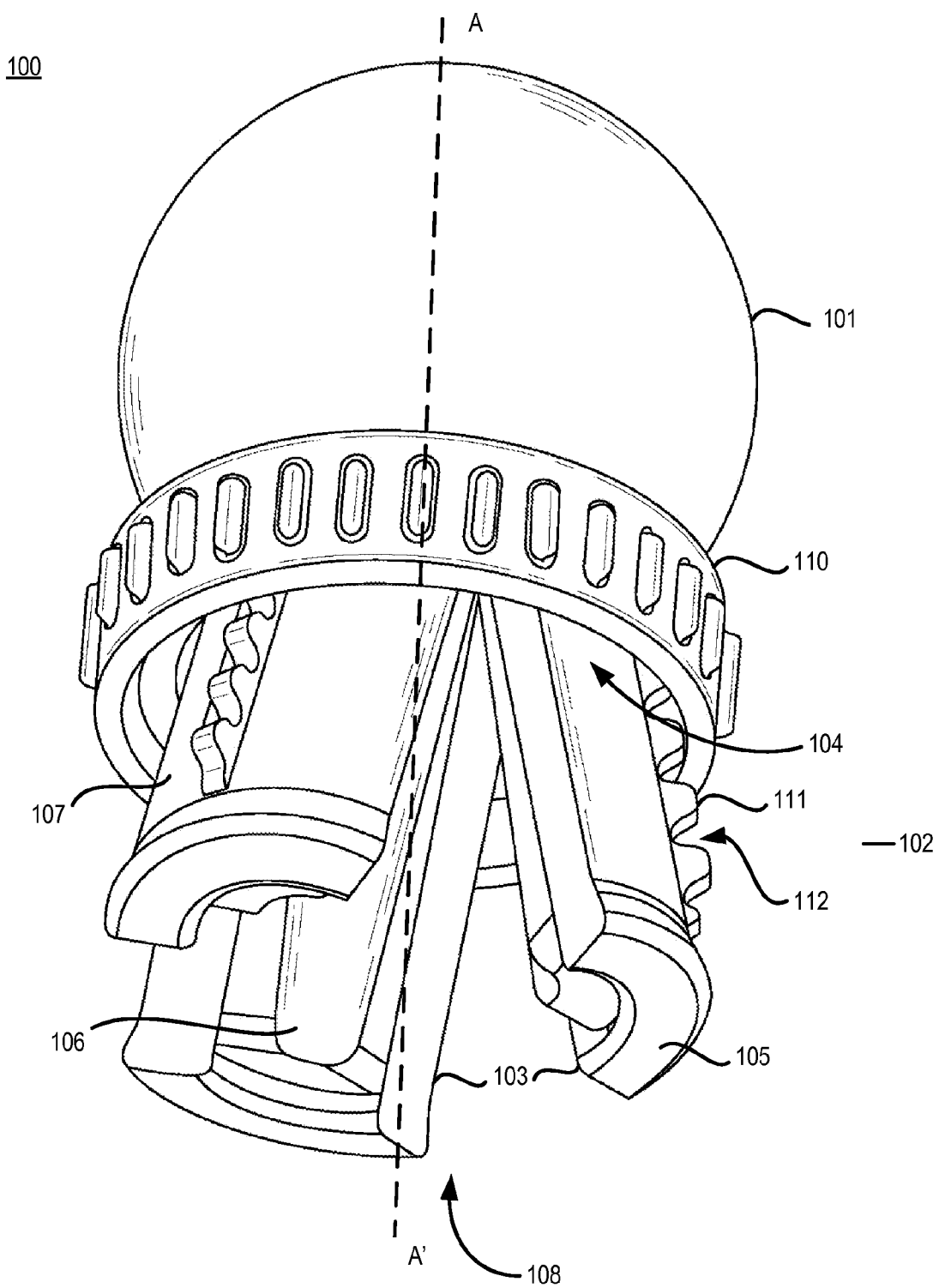
FIG. 1 illustrates a perspective view of a device in accordance with various embodiments.
Figure 2A:
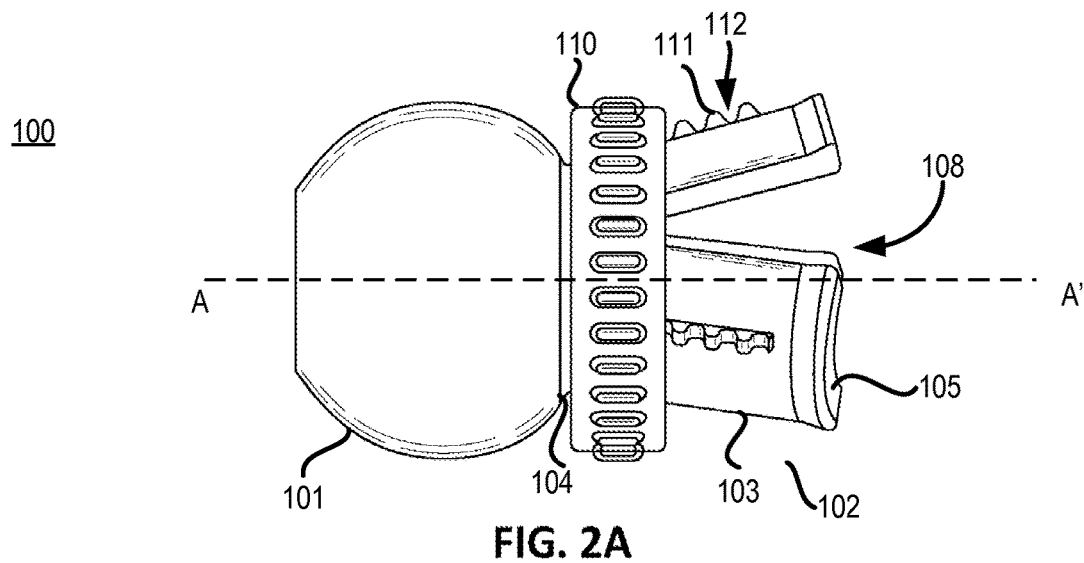
FIGS. 2A and 2B illustrate profile views of a device in accordance with various embodiments.
Figure 2B:
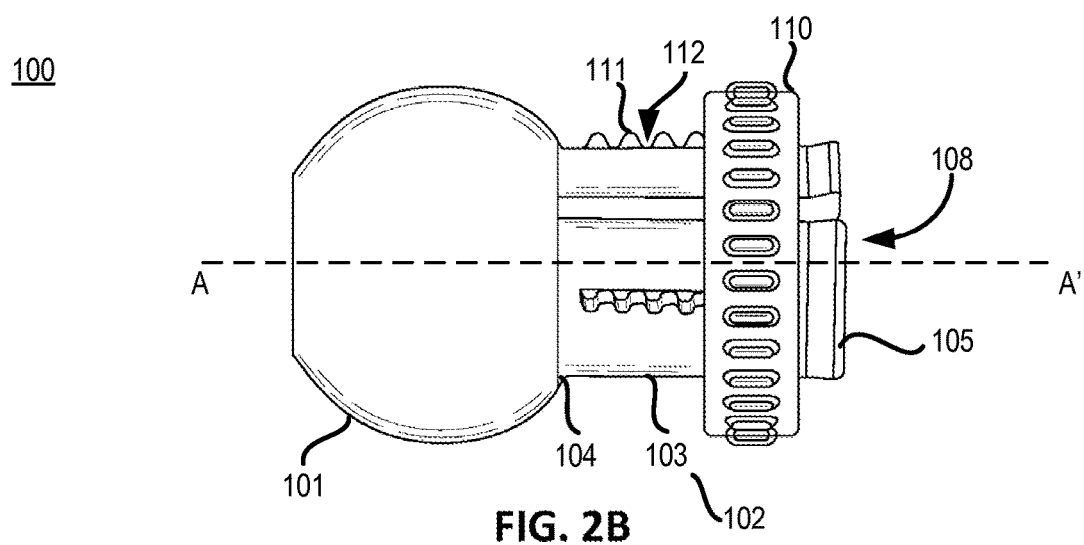
Figure 3:
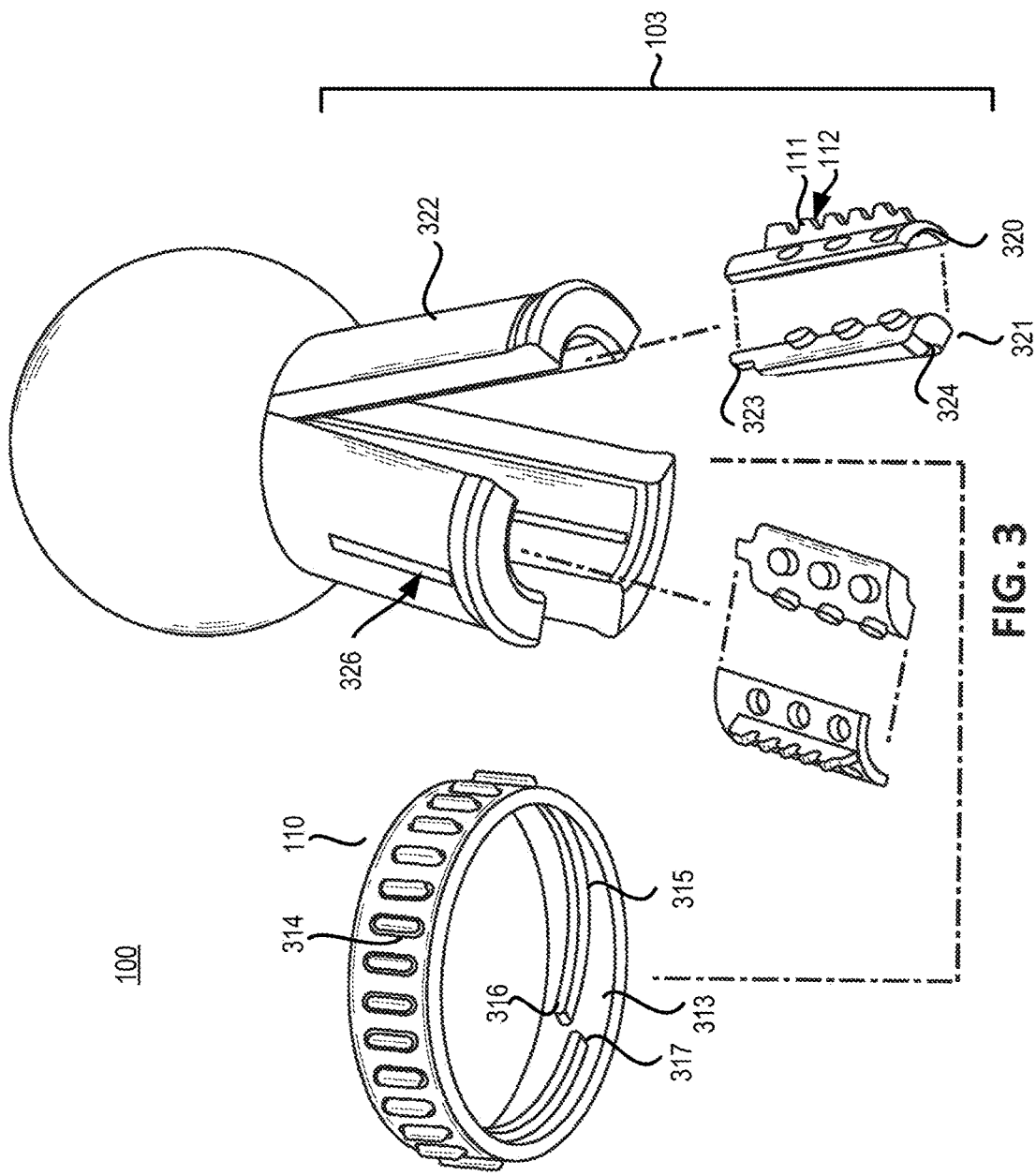
FIG. 3 illustrates an exploded view of a device in accordance with various embodiments.

With continued reference to FIGS. 1-2B and with reference now also to FIG. 3, in various embodiments, device 100 may further comprise a twist ring 110. Twist ring 110 may be configured to operatively engage a plurality of protrusions 111 distributed axially along the length of the exterior surface 107 of each arm 103. Each pair of adjacent protrusions 111 may be separated by a pitch (i.e., the distance between peaks of adjacent protrusions) and define a valley 112. Twist ring 110 may comprise an annular structure with an interior surface 313 and an exterior surface 114. Interior surface 113 may comprise a helical ridge 115 with a first end 116 and a second end 117 offset from first end 116. Each valley 112 may be complementary to and configured to receive helical ridge 115 of twist ring 110. Thus, twist ring 110 may comprise an internally threaded nut, while the axially distributed protrusions located along the exterior surfaces of arms 103 comprise external threads of body 102 that are engaged by twist ring 110.

In operation, rotation of twist ring 110 in a first rotational direction produces linear translation of twist ring 110 along the axis A-A' in a first linear direction, such as in a distal direction toward the distal end of device 100. Rotation of twist ring 100 in a second rotational direction (i.e., the opposite direction of the first rotational direction) produces linear translation of the twist ring along the axis A-A' in a second linear direction (i.e., the opposite direction of the first linear direction), such as toward the proximal end of device 100.

In various embodiments, each arm 103 may comprise a first radial dimension at a first axial position and a second radial dimension at a second radial position. For example and as described briefly above, the thickness of an arm 103 (i.e., the radial dimension) may increase from a first thickness at a first axial position located toward the proximal end 104 of the arm 103 to a second thickness at a second axial position located toward the distal end 105 of the arm 103. Thus, the first radial dimension at the first axial position may be less than the second radial dimension at the second axial position, producing an arm thickness that tapers from thinner to thicker in a distal direction along a portion of the axial length of arm 103. The tapered arm thickness configuration can define a cavity 108 with a frustoconical cavity shape when arms 103 are in the closed position (FIG. 2B), with the cavity decreasing in diameter from a first axial position along body 102 to a second axial position distal to the first axial position.

In various embodiments, a component of device 100 that comprises the interior surface 106 of arm 103 may provide the tapered arm thickness configuration described above. For example and with reference now to FIG. 3, an arm 103 of device 100 can comprise a plurality of components, such as a support component 320, interior gripping component 321, and exterior body component 322. A longitudinal slot 326 may be defined through arm 103 and/or exterior body component 322. Interior gripping component 321 may be configured with an increased radial thickness from a proximal end 323 to a distal end 324. A device 100 comprising a plurality of arms 103 thus configured may therefore comprise a cavity with a frustoconical cavity shape with a decreasing cavity diameter when the arms are in the closed position, as described above.

Figure 4C:
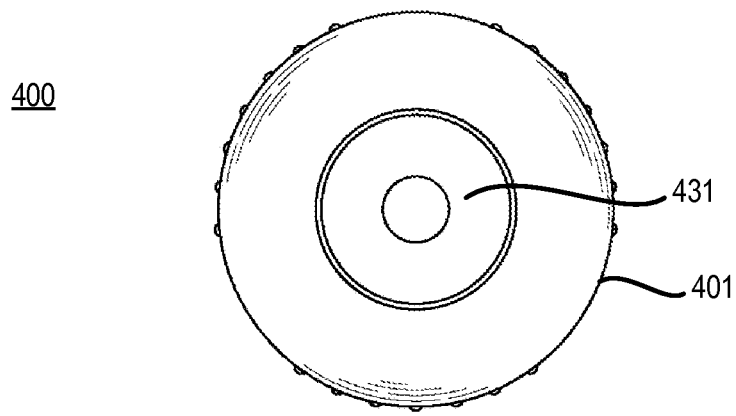

Various other configurations of a device that may be used to secure a pet treat are possible within the scope of the present invention. For example and with reference to FIGS. 4A-4C, in various embodiments, a device 400 may comprise arms 403, with each arm having an interior gripping component 421 of substantially uniform thickness such that arms 403 likewise have a substantially uniform radial thickness along the axial length of each arm 403 that also comprises interior gripping component 421 (i.e., excluding the portion of the axial length of each arm 403 at the distal end that does not comprise interior gripping component). In various embodiments, device 400 may also comprise a depression 430 in head 401 located between the proximal ends of arms 403 as well as a depression 431 in the proximal end of head 401. Other surface features and configurations of a head of a device are possible within the scope of the present disclosure, as described elsewhere herein, for example, with reference to FIGS. 5A-5C.

Likewise, a device in accordance with various embodiments may be provided in a variety of sizes. For example, a device may be configured with an overall length of about 3 inches to about 4 inches and a diameter (at the head) of about 1.5 inches to about 2.5 inches, with a cavity diameter configured to receive and secure treats with nominal diameters of between about 0.75 inches and about 1.25 inches. In various embodiments, a device may be configured with dimensions scaled proportionately upward or downward in size to accommodate treats with larger diameters and smaller diameters. For example, a device may be configured with dimensions suitable to receive and secure treats with nominal diameters of between about 1.125 inches and about 1.625 inches, or a device may be configured with dimensions suitable to receive and secure treats with nominal diameters of between about 0.375 inches and about 0.875 inches. A device in accordance with various embodiments may have any of a variety of sizes and be configured to receive a treats having any of a variety of diameters.

Figure 6:
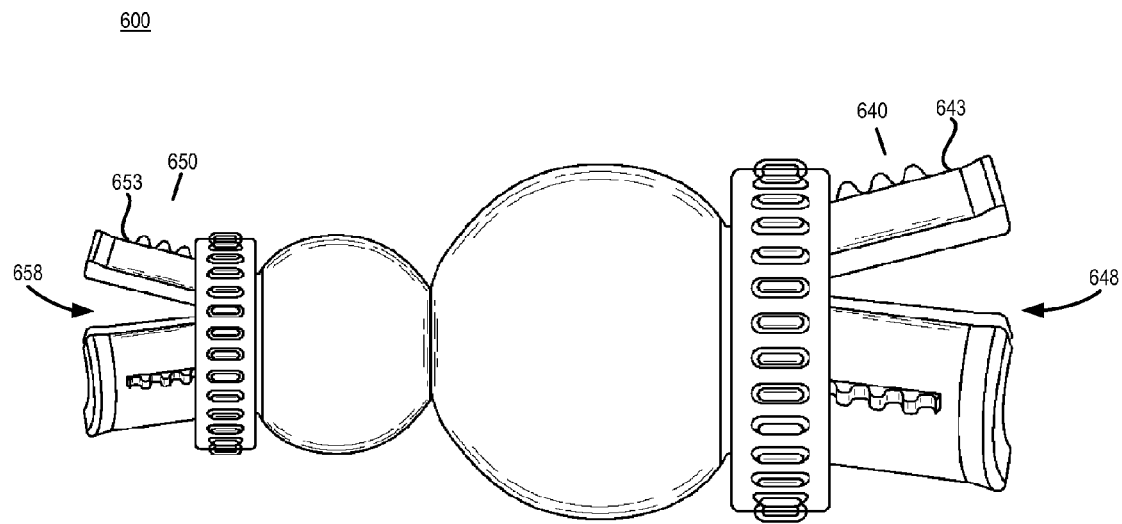
FIG. 6 illustrates a profile view of a device in accordance with various embodiments.

In various embodiments, a device may comprise two sets of opposable arms. For example and as illustrated in FIG. 6, a device 600 may be configured to resemble two devices conjoined at their respective proximal ends, each having various features described above with respect to device 100 but having proportionally different sizes. A single device 600 can thereby provide a first body 640 comprising a first plurality of opposable arms 643 and a second body 650 comprising a second plurality of opposable arms 653. Opposable arms 643 comprising first body 640 may define a first cavity 648 having a first diameter that is greater than the diameter of a second cavity 658 defined by opposable arms 653 comprising second body 650. In this manner, a single device can receive and secure treats having an increased range of treat diameters as compared to a device such as device 100 comprising a single body and plurality of opposable arms.

Method of Use

Figure 7A:
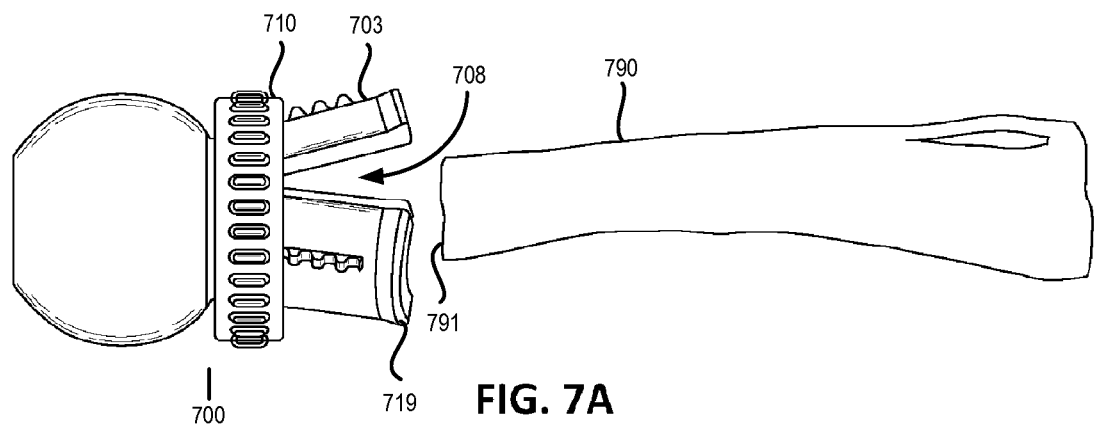
FIGS. 7A and 7B illustrate a perspective view of a device in accordance with various embodiments in relation to a treat.
Figure 7B:
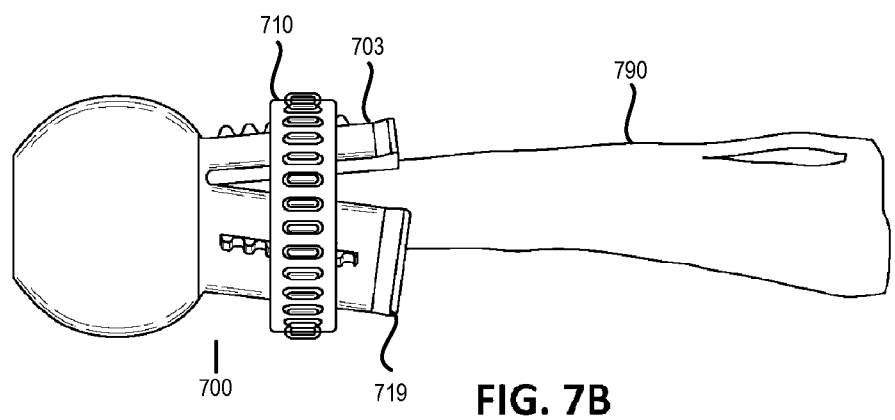

In various embodiments, a device comprising various features described above may be used to secure a pet treat. With reference now to FIGS. 7A and 7B, a method of securing a treat 790 using device 700 is illustrated. FIG. 7A shows a treat 790 axially aligned with device 700, with a first end 791 of treat 790 adjacent the opening of cavity 708 at the distal end of device 700. Twist ring 710 is located at a proximal axial position and arms 703 of device 700 are in an open position. First end 791 of treat 790 may be inserted into the opening of cavity 708. As shown in FIG. 7B, arms 703 may be closed around the first end of treat 790. In accordance with various embodiments, treat 790 is not completely inserted within or enclosed by device 700. Instead, a portion of treat 790 extends distally from device 700 while first end 791 of treat 790 is secured within device 700, as described below. A locking mechanism such as twist ring 710 may then be secured around the plurality of arms 703, securing first end 791 of treat 790 in cavity 708 of device 700 due to the compressive force exerted on the inserted distal end 791 of treat 790 by the plurality of arms 703 and the locking mechanism. In various embodiments, securing locking mechanism can comprise translating a locking mechanism from the proximal ends of each of the plurality of arms 703 toward the distal ends of each of the plurality of arms. As described above, a locking mechanism such as twist ring 710 may be threadedly engaged to the plurality of arms 703, and translating the locking mechanism may be accomplished by rotating the locking mechanism.

In various embodiments, twist ring 710 can be removed over distal the distal end of arms 703. In various other embodiments, flange or other retention mechanism may be located near the distal ends of arms 703 so that twist ring 710 is not removable. For example, a flange 719 may be configured to prevent twist ring 710 from translation or removal over the distal ends of arms 702.

In various embodiments, a treat (or an unchewed portion thereof) secured by device 700 may be removed by reversing the locking mechanism, such as by rotating twist ring 710 in the opposite direction of that required to translate the twist ring 710 in a distal direction. Arms 703 may move to an open position as the locking mechanism is translated proximally. An unchewed portion of a treat may be easily removed due to the open configuration of arms 703 and replaced with a new treat.

Figure 8A:
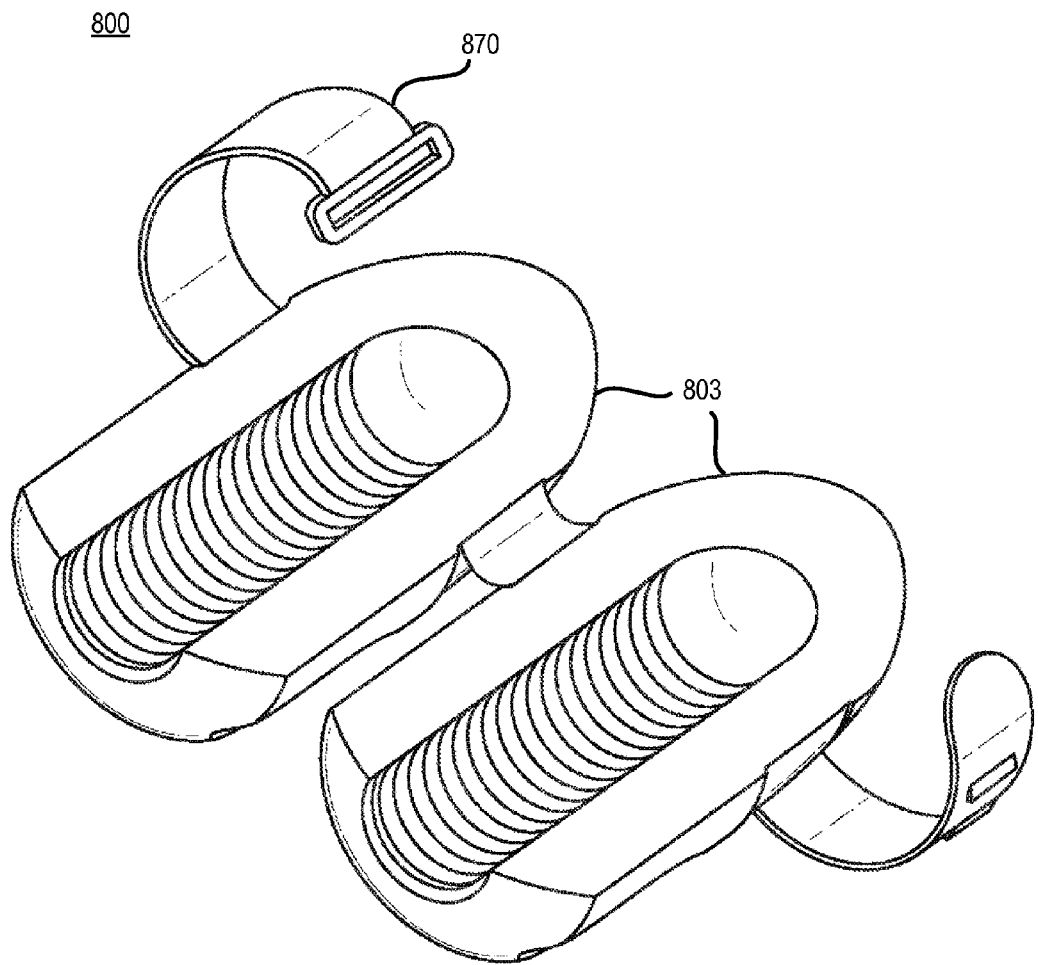
FIGS. 8A and 8B illustrate perspective views of a device in accordance with various embodiments.
Figure 8B:
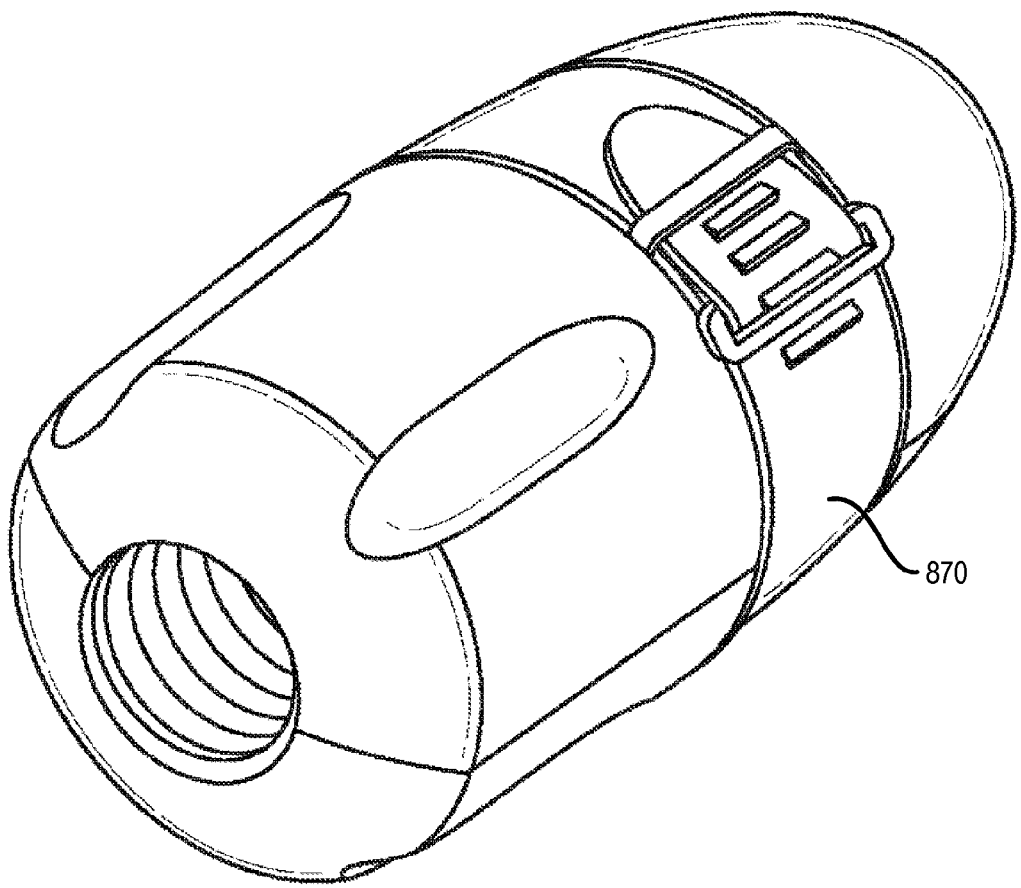

In various embodiments, translating a locking mechanism may be accomplished by simply sliding the locking mechanism, followed by a partial rotation to engage a mechanism to prevent the locking mechanism from sliding in reverse. In various other embodiments, securing locking mechanism may comprise wrapping a locking mechanism around a plurality of arms, such as with an elastic strap 870 that may be tightened and secured around arms 803 of device 800, as illustrated in FIGS. 8A and 8B.

As described in greater detail below, securing a locking mechanism may increase a compression force within at least one of a plurality of opposable arms. The increased compression force may produce an increased static friction force between a portion of an interior surface of one of the plurality of arms and a portion of the surface of the treat. The increased static friction force may provide for retention of the treat within the cavity of the safety device.

Materials and Methods of Manufacture

A device in accordance with various embodiments can comprise a plurality of materials. Each of the plurality of materials may provide different physical properties. For example and with reference again to FIGS. 1-3, each of the components of arm 103 of device 100 may comprise a different material. The material used for support component 320 may be selected to provide secure engagement of twist ring 110 by protrusions 111 and distribution of compression force applied by twist ring 110 to arms 103 along the axial length of arms 103. The support component 320 can comprise a relatively rigid polymer material, such as a thermoplastic polyurethane with Shore hardness of about 60 Shore D to about 90 Shore D. Likewise, twist ring 110 may similarly comprise a rigid polymer material, such as Tecamid® ST Type 6/6 nylon (Ensinger Industries, Inc., Washington, Pa.) or similar material).

Figure 9:
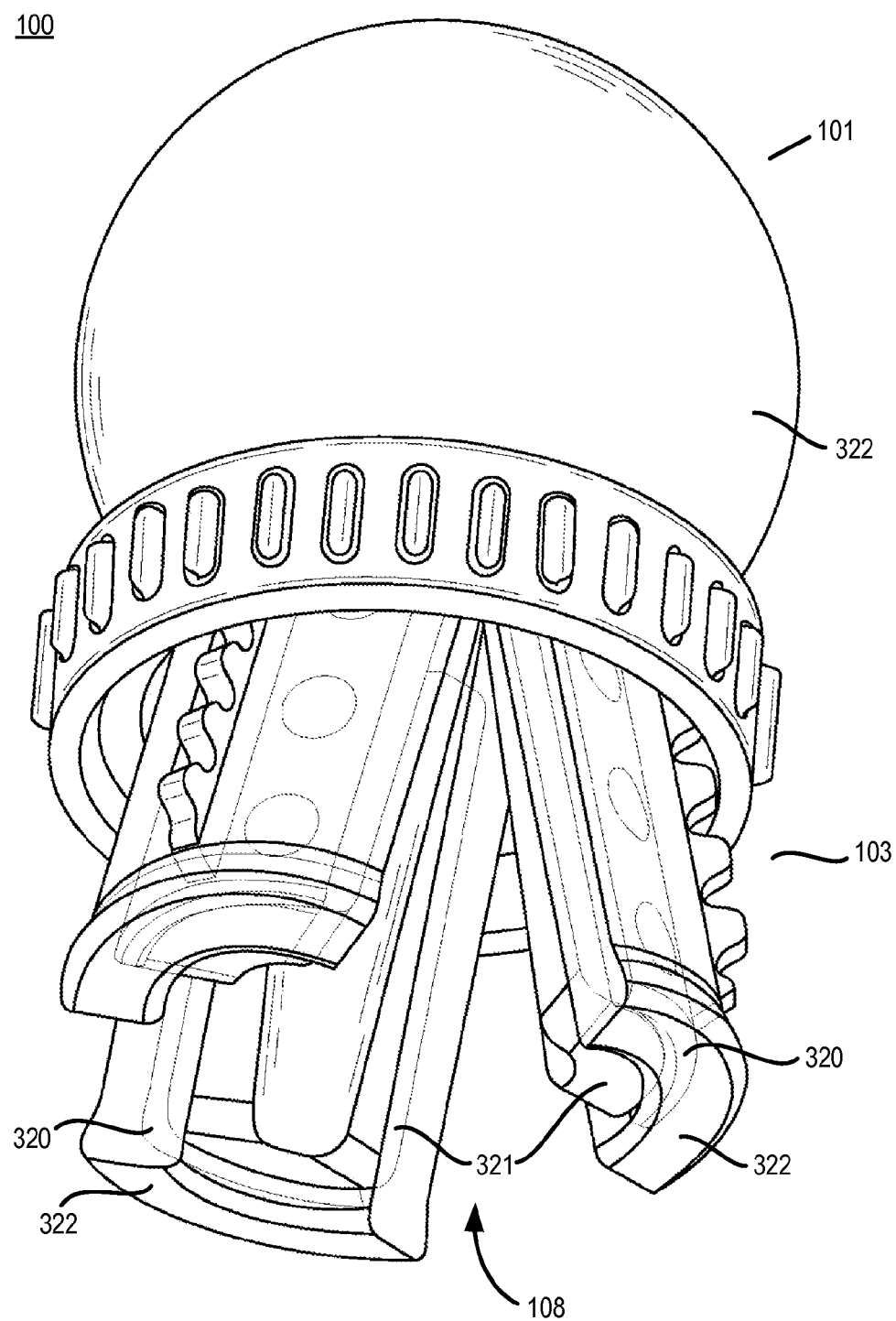
FIG. 9 illustrates a perspective view of a device in accordance with various embodiments showing the relative positions of various internal structures.
Figure 10:
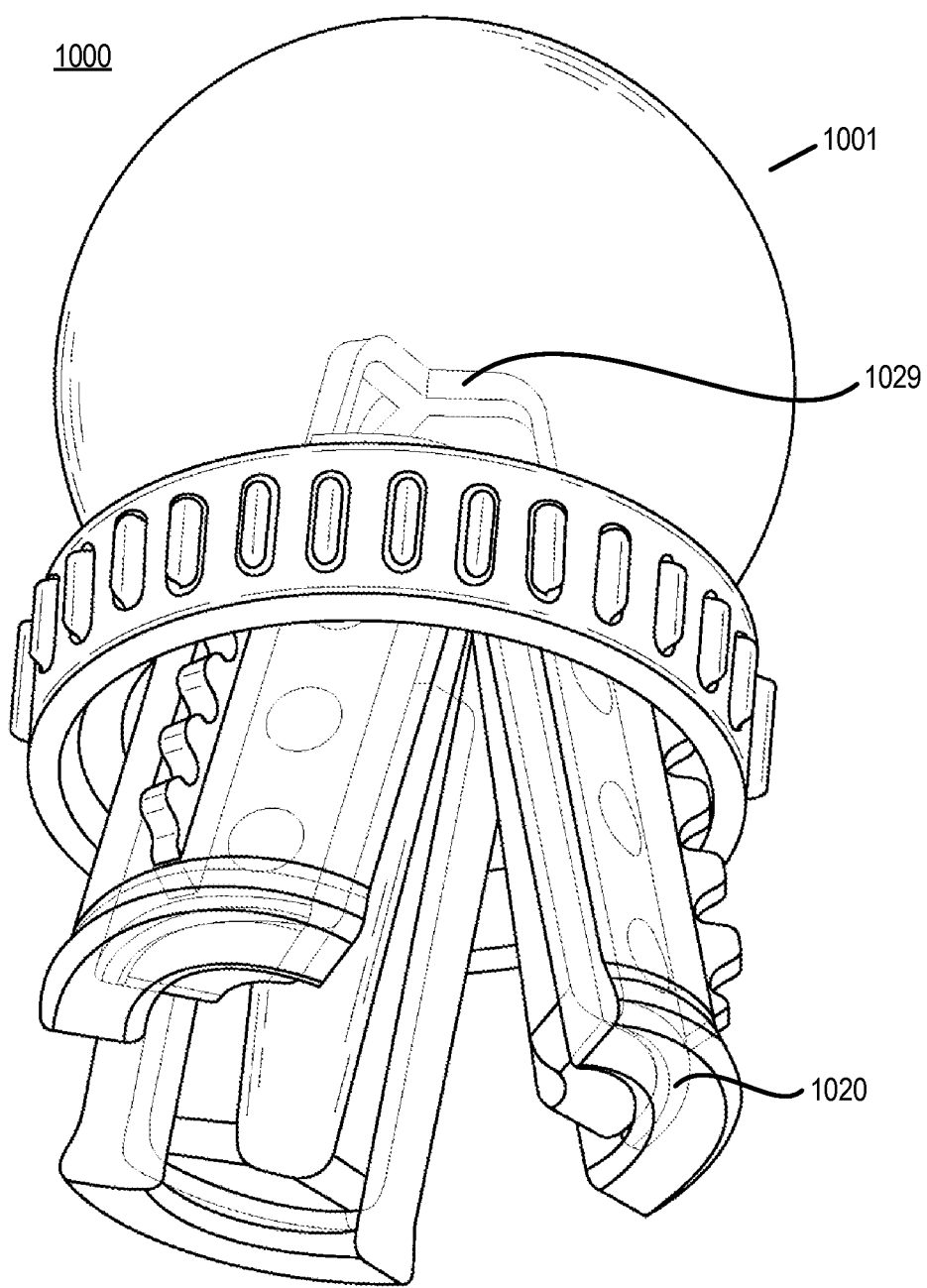
FIG. 10 illustrates a perspective view of a device in accordance with various embodiments showing the relative positions of various internal structures.

In various embodiments, support components of a device may comprise separate components, such as support components 320 of device 100 illustrated in FIG. 3, with further reference now also to FIG. 9. In various other embodiments and as illustrated in FIG. 10, support components may comprise a single, integrally formed support component 1020, with the portions of each support component located in device arms 1003 attached to one another by a joining portion 1029 located in the head 1001 of device 1000.

Referring again to FIGS. 3 and 9, interior gripping component 321 can comprise a soft, tacky material configured to conform to the shape of the external surface of the inserted treat as a compression force is applied, such as by axial translation of the twist ring. For example, the interior gripping component can comprise a rubber or polymer material with a Shore hardness of about 30 Shore A to about 60 Shore A suitable to provide elastic deformation of the gripping component under a compression force. In various embodiments, applying or increasing a compression force of an arm 103 against a treat located in cavity 108 produces an increased static friction force between a portion of the interior surface of the arm and a portion of the surface of the treat that the arm is in contact with. The increase in static friction force provides for retention of the treat in the cavity 108 of device 100 and increased resistance against movement of a treat relative to device 100 caused by a shear force between the treat and device 100. In various embodiments, the material used for interior gripping component 321 and/or the configuration of the surface (e.g., surface texture configuration) may provide resistance to a decrease in static friction force due to wetting the interface between the surface of the interior gripping component 321 and the surface of the treat, for example, by pet saliva. For example, in various embodiments, the interior surface of interior gripping component 321 may comprise ridges or teeth arranged perpendicular to axis A-A' to provide further static friction force between the interior surface of an arm and the portion of the surface of the chew to that the arm is in contact with.

The exterior body component 322 of device 100 can comprise a medium hard to hard rubber or polymer with a Shore hardness of from about 50 Shore A to about 90 Shore A to provide for durability. In various embodiments, head 101 of device 100 may comprise the same material as exterior body component 322, and head 101 and interior body component 322 may be integrally formed, providing a unitary construction of head 101 and body 102. A material used for exterior body component 322 of device 100 may provide the device with one or more physical properties including high durability, high tensile strength, and puncture resistance. Additionally, the material may be non-toxic to pets and provide dental massage and teeth cleaning benefits when chewed.

In various embodiments, a device need not comprise an interior gripping component that is separate from exterior body component 322. Instead, exterior body component 322 may overlay support component 320 and comprise both the interior surface and the exterior surface of each arm 103.

Methods of manufacturing a device in accordance with various embodiments are described in greater detail below.

In various embodiments, a method of manufacturing a pet treat holding device is provided. A method of manufacturing a device may comprise forming an arm support component. An arm support component may comprise a first material, as described above. In various embodiments, an arm support component may be injection molded from a thermoplastic material. An arm support component may comprise support component portions of a plurality of arms joined by a joining portion 1029, as described above with reference to FIG. 10.

A method of manufacturing a pet treat holding device may further comprise attaching an arm lining component to the arm support component. The arm lining component may comprise a second material, such as a material described above with respect to interior gripping component 321. In various embodiments, an arm lining component may be overmolded onto arm support component in a first overmolding step. In various other embodiments, an arm lining component may be manufactured separately from the arm support component and subsequently attached to an arm support component, such as by an adhesive, a friction fit, or other attachment means. Attaching an arm lining component to an arm support component may produce a lined device arm.

In various embodiments, a method of manufacturing a pet treat holding device may comprise attaching a plurality of arms to a head. Attaching a plurality of arms to a head may be performed in a second overmolding step. The second overmolding step may simultaneously form the head of a device and the exterior surface of each of the plurality of arms. In various embodiments, a third material may be used in the second overmolding step, such as a material described above with respect to exterior body component 322 of FIGS. 3 and 9. Thus, the head and each of the plurality of arms of a device may comprise a third material forming a unitary exterior body component, with the unitary exterior body component providing attachment of each of the plurality of arms to the head. In accordance with various embodiments, the exterior body component may be configured to be elastically deformable such that each of the plurality of arms may be independently articulable relative to the head. In various embodiments, a head of a device may comprise depression or cavity such as depression 531A (FIG. 5A). A depression or cavity may reduce the quantity of material used to manufacture a device, thereby reducing manufacturing cost, without negatively affecting the function or durability of the device.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A pet treat holding device comprising:
  a head;
  a body comprising a plurality of opposable arms, each of the plurality of opposable arms comprising a proximal end and a distal end, the proximal end of each of the plurality of opposable arms operably attached to the head,
  wherein each of the plurality of opposable arms includes a longitudinal slot,
  wherein each of the plurality of opposable arms is moveable between a first position and a second position,
  wherein the plurality of opposable arms in the second position define a cavity comprising one of a cylindrical shape and a frustoconical shape, the cavity having an opening at a distal end of the device, and wherein each of the plurality of opposable arms comprises an exterior surface, a plurality of support components each comprising a plurality of protrusions and each including an internal gripping component that is configured to engage and grip a pet treat, and wherein the protrusions pass through the longitudinal slot and exterior surface of each of the plurality of opposable arms; and a twist ring configured to operatively engage the plurality of protrusions.

2. The device of claim 1, wherein the twist ring comprises an annular structure with an interior surface and an exterior surface, wherein the interior surface comprises a helical ridge with a first end and a second end.

3. The device of claim 2, wherein adjacent protrusions of the plurality of protrusions define a valley between the adjacent protrusions.

4. The device of claim 3, wherein the valley is configured to receive the helical ridge of the twist ring.

5. The device of claim 4, wherein a first rotational movement of the twist ring in a first direction translates the twist ring in a first axial direction, and wherein a second rotational movement of the twist ring in a second direction translates the twist ring in a second axial direction.

6. The device of claim 5, wherein each opposable arm comprises a first radial dimension at a first axial position and a second radial dimension at a second axial position.

7. The device of claim 6, wherein the second axial position is distal to the first axial position, and wherein the second radial dimension is greater than the first radial dimension.

8. The device of claim 1, wherein the head and the body are unitary.

9. The device of claim 8, wherein the head and body are formed from a plurality of materials.

10. The device of claim 9, wherein each of the plurality of materials is integrally joined by an overmolding process.

11. The device of claim 9,
wherein the head and the exterior surface of each of the plurality of opposable arms are formed from a first material, wherein the interior surface is formed from a second material, and
wherein the plurality of protrusions are formed from a third material.

12. The device of claim 11, wherein the first material is different from the second material.

13. The device of claim 11, wherein the first material is different from the third material.

14. The device of claim 11, wherein the second material is different from the third material.

15. The device of claim 1, wherein the head defines a cavity that is configured to receive an end of a pet treat.

16. A pet treat holding device comprising:
a head;
a body comprising a first opposable arm and a second opposable arm, each of the first opposable arm and second opposable comprising a proximal end and a distal end, the proximal end of the first opposable arm and second opposable operably attached to the head,
wherein the first opposable arm includes a first longitudinal slot,
wherein the second opposable arm includes a second longitudinal slot,
wherein each of the first opposable arm and second opposable arm are movable between a first position and a second position,
wherein the first opposable arm and second opposable arm at least partially define a cavity comprising one of a cylindrical shape and a frustoconical shape, the cavity having an opening at a distal end of the device, and
wherein each of the first opposable arm and second opposable arm comprise an exterior surface;
a first support component comprising a plurality of first protrusions and a first internal gripping component that is configured to engage and grip a pet treat
wherein the first plurality of protrusions pass through the first longitudinal slot and exterior surface of the first opposable arm;
a second support component comprising a plurality of second protrusions and a second internal gripping component that is configured to engage and grip the pet treat;
wherein the second plurality of protrusions pass through the second longitudinal slot and exterior surface of the second opposable arm; and
a twist ring configured to operatively engage the plurality of protrusions.

17. The device of claim 16, wherein the twist ring comprises an annular structure with an interior surface and an exterior surface, wherein the interior surface comprises a helical ridge with a first end and a second end.

18. The device of claim 16, wherein adjacent protrusions of the plurality of first protrusions define a valley between the adjacent protrusions.

19. The device of claim 17, wherein the valley is configured to receive the helical ridge of the twist ring.

20. The device of claim 18,
wherein a first rotational movement of the twist ring in a first direction translates the twist ring in a first axial direction, and
wherein a second rotational movement of the twist ring in a second direction translates the twist ring in a second axial direction.

* * * * *